June 30, 1970     J. M. BROADHURST     3,518,154
PROCESS FOR MAKING FLOCK DECORATED MATERIALS AND PRODUCT
Filed Sept. 6, 1967     2 Sheets-Sheet 1
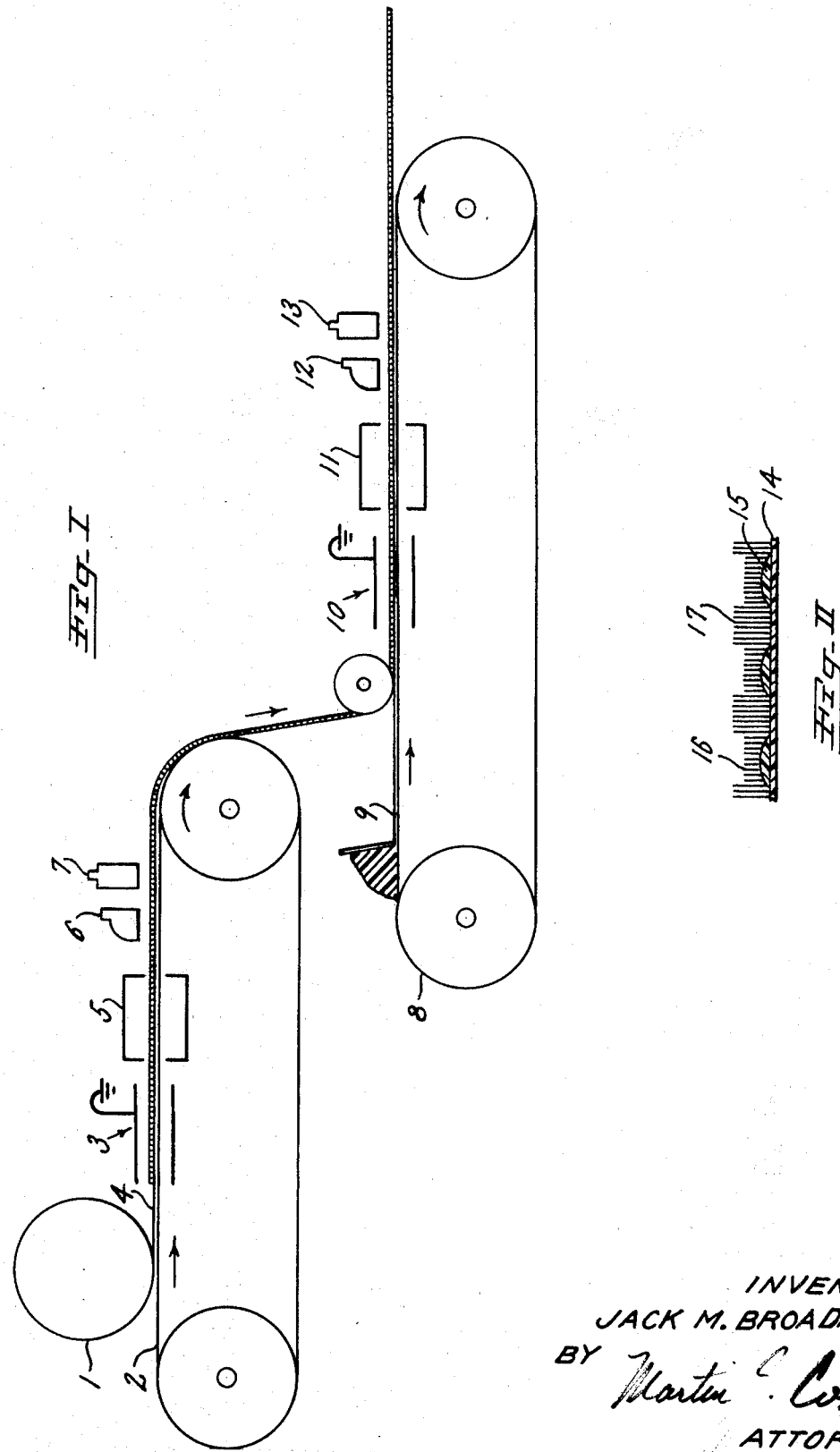
INVENTOR
JACK M. BROADHURST
BY *Martin C. Cohen*
ATTORNEY

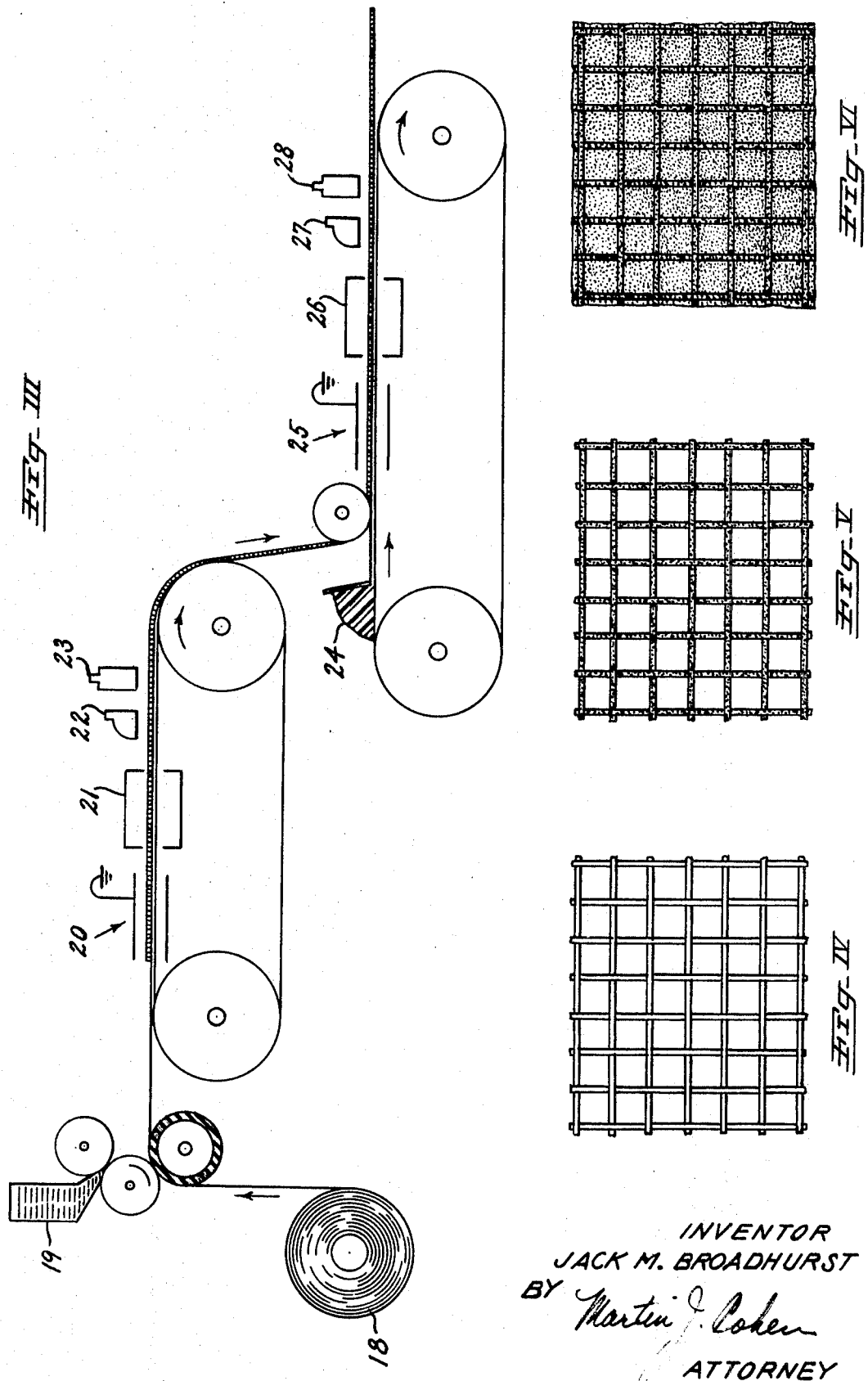

excess fiber lies only upon the surface of the plastic, thus failing to penetrate to the interstices. Any of the plastic materials mentioned earlier are useful for this step of the process, as well as any other plastic having the requisite properties. A vinyl plastisol or a thermosettable or thermosetting polyurethane appear to exhibit the most satisfactory results.

United States Patent Office 3,518,154
Patented June 30, 1970

3,518,154
PROCESS FOR MAKING FLOCK DECORATED
MATERIALS AND PRODUCT
Jack M. Broadhurst, Mishawaka, Ind., assignor to Uniroyal, Inc., New York, N.Y., a corporation of New Jersey
Filed Sept. 6, 1967, Ser. No. 665,812
Int. Cl. D04h 11/00; B44c 1/08
U.S. Cl. 161—64                              8 Claims

ABSTRACT OF THE DISCLOSURE

The invention resides in the production of a patterned flocked material produced without resorting to grid-like shield members. The pattern is effected by first depositing a liquid, plastic material on a continuous belt in an uninterrupted pattern containing a plurality of spaced open portions. Thereafter, the wet plastic design is flocked, heated, if necessary, so that it is partially fused or cured, and then this flocked component is passed onto a second releasable belt which has been prepared with a film of liquid plastic material. The entire composite is one again flocked, preferably with a material exhibiting a different color or length, whereby the second application of flock fiber only adheres to those exposed surfaces of the second plastic layer. Lastly, the entire composite is passed through a final heating unit wherein the first flocked component is united to the second layer, and all the flock material is securely set.

---

The invention relates to the process of producing a flocked sheet material, exhibiting particulate material of more than one property, i.e. flock of different lengths, colors or coarseness, without resorting to the use of conventional grid-like shield members. The products produced by this process may display intricate designs wherein the borders between differing property areas are sharply delineated. The potential uses of this novel process are unlimited, a fact that will become apparent as the various aspects of the invention are unfolded; however, it is evident that the process has a variety of applications particularly in the floor covering industry, in upholstery material, in clothing and in footwear.

My invention may be practiced as a continuous process where the various steps are performed on a continuous carrier equipped with releasable surface. The releasable surface (or casting paper surface) is well known in the industry, and consists of a base web of paper over which a coating of a material imparting a smooth, hard texture non-adherent to the plastic material has been applied. Such coating materials as melamine, modified alkyds, varnish, nitrocellulose, and casein allow for the simple removal of moist or tacky substances and cured, cooled or fused materials from the carrier surface.

The first step of my invention entails the deposition of a heat settable plastic or thermoplastic resinous material in a predetermined pattern containing a plurality of spaced open portions on the aforementioned continuous belt.

I have determined that the process is best practiced utilizing a thermoplastic resinous material in the thixotropic state, or a thermosetting compound displaying increased viscosity due to the addition of fillers or thickening agents; and that the desired pattern should be designed from a plastic material displaying this thickened form. The thixotropic or thickened character of the plastic will provied a textured effect in the finished flocked product, and will also insure the establishment of a clear, sharp, fine lined design. The almost solid character of the material will prevent the pattern from altering its shape by "running" or spreading, once it has been applied; however, it will continue to be receptive to a fiber being imbedded in its surface.

The plastic is preferably comprised of a vinyl plastisol or polyurethane composition; however, any number of materials may be substituted. Among these, epoxypolysulfide rubber, epoxy polyamide, polyethylene, polyvinyl acetate, flexible acrylic resins and liquid pourable silicone rubber are a few of the more acceptable plastics. The plastic is deposited in an uninterrupted pattern on the carrier by means of a stencil, an intaglio roll, nozzle type unit, or equivalent dispensing device. The depth of the plastic is governed by the properties of the fiber to be subsequently imbedded therein, as well as the proposed utility of the final flocked material; however, it has been determined that a depth of from about 0.10 inch to about .125 inch is practical for my purposes.

At this point, flock, particulate material or fiber of a desired color, length, and coarseness is applied to the plastic by any conventional means. It has been found that electrostatic flocking achieves a superior result; however, the beater bar technique is also acceptable, although it often causes "flow out" in the patterned component. While still supported on the releasable carrier surface the flocked plastic is gelled, partially or completely fused, cooled, any excess fiber not adhering to the wet plastic is then removed by vacuum cleaning, or other appropriate methods, and the flocked component is removed from the surface without rupturing. Now, the flocked component is passed onto a second, continuous, releasable belt which has been provided with an uninterrupted layer of heat settable or thermoplastic resinous material. Ordinarily, this layer of plastic is applied by means of a doctor knife, which can be regulated to yield a uniform film. Generally, it is desirable to employ this resinous film in a depth of at least 5 mils, while a preferrd thickness of from 10 to 25 mils is recommended. This base layer must be of sufficient depth and consistency to support the first flocked design component and also to support a subsequent application of flock. After the flocked plastic component from the primary operation is superimposed on the wet surface of the plastic layer, the entire composite is flocked with a fiber differing in color or length from that which was used in the first flocking operation. Once again, electrostatic methods are deemed preferable; however, any technique achieving the desired result is deemed acceptable. Since the flocked component of the first step had been embedded in the wet plastic layer, the flock applied in the second operation can only adhere to those exposed wet plastic areas showing through the total composite. This technique therefore achieves a distinct two phased system. After passing the material through a final heating unit, the material is cooled, and all excess flock, i.e. any fiber not adhering to the plastisol layer, is cleaned from the surface by a brushing operation. Upon passage through the heater, the initial flocked component is fused to the second plastic layer, and all the flock which had been applied in both applications is securely set in its foundation layers.

Another aspect of my invention entails the use of an open mesh plastic coated fabric to develop the flocked patterned component containing a plurality of spaced open portions, rather than utilizing the aforementioned plastic composition alone. In this feature, an open mesh fabric of predetermined design is coated on its surface with a plastic material selected from the group consisting of thermosettable plastics and thermoplastic material, in such a manner that the interstices remain uncoated or "open." As it is imperative that the interstices of the fabric remain free and unclogged, the fabric chosen should contain openings at least $\frac{1}{16}$ inch square, and care should be taken to apply the plastic only to the strands of the fabric. This precaution will assure that the final flocked material possess distinctly defined boundaries between its two flocked areas.

The coated fabric is then subjected to a flocking system, preferably by electrostatic means, the flocked fabric is passed through a heating unit, cooled, and any excess flock is cleaned away. The electrostatic procedure is deemed most desirable for this embodiment because it is more likely to effect a uniformly upright position for the flock material, i.e. perpendicular to the mesh fabric, and therefore allows the interstices or spaces to remain open. Other flocking techniques, although acceptable, are less likely to achieve this desired result. The plastic material may be allowed to fuse or cure totally, however, partial gelling or incomplete fusing or curing is preferred. With the flock now secured in the plastic, the fabric is set into a liquid plastic base film selected from the group consisting of thermosettable plastics and thermoplastic resinous material, which has been applied on a second continuous releasable belt as disclosed above in my first embodiment. A second flock, possessing different properties, is applied to the entire composite, and this flock adheres only to the exposed areas in the plastic showing through the interstices in the fabric. A second heating application follows, at a temperature sufficiently regulated to completely fuse or cure the plastic in both layers, thereby uniting the coated fabric to the base film and also binding the second application of flock to the plastic base layer where it had been exposed. Finally, the product is cooled and cleaned.

The product produced by my novel process, especially those employing a vinyl plastisol in the first patterned layer, may possess a harsh, inconsistent feel. To overcome this undesirable property, particularly in floor covering material, the addition of a blowing agent to the vinyl plastisol may be desirable. A resulting product displaying a soft, more resilient grid-like member on the vinyl base layer will be produced due to the decomposition of the blowing agent when the entire composite is subjected to the final high temperature fusion. The blowing action may also be utilized to produce a textured surface in the final product as a result of differing the heights in the flock fibers. This anomaly will be effected even though both flocking steps employ identical particulate material. The use of a blowing agent generates a more resilient ridge in the final material, thereby resulting in a softer consistency in the product.

In the case of floor covering material, it may also be advisable to modify the base composition by the addition of a blowing agent to provide more resilient material. Several components have been utilized as blowing agents for vinyl plastisol with azodicarbonamide, N,N'-dimethyl-N,N'-dinitrosoterephthalamide in white mineral oil (70:30 ratio) and N,N'-dinitrosopentamethylene tetramine in an inert filler (40:60 ratio) the most common.

Flock material of relatively wide composition can be employed in my process, including nylon, Orlon, Dacron, rayon, polypropylene, etc. Successful application of flock ranging from 1½ denier to 55 denier (the higher the number the coarser the fiber), and ranging in length from 20 mils to 300 mils has been achieved. The denier of the flock is generally increased with increasing flock length, however, the desired texture of the end product dictates these properties, and no fixed rule governs the choice of flock.

For a fuller understanding of the nature and objects of my invention, reference should be had to the following detailed descriptions taken in conjunction with the accompanying drawing in which:

FIG. I represents a diagrammatic layout of the equipment for practicing the process of the invention; FIG. I runs from left to right commencing with a dispensing roll 1 from which the plastic material 4 is applied in a predetermined pattern on the continuous releasable surface 2. Flock is applied at station 3, and the flocked plastic is then partially fused or cured when passed through heater 5. Following a cooling procedure 6 and a vacuum cleaning step 7, the flocked component is then passed onto a second continuous releasable surface 8 where it is superimposed upon a thin wet plastic film 9 and subjected to a second flocking operation 10. The total composite is then moved through a heater 11 where total fusion or curing takes place and the new flock is set in the base film, while the first flocked patterned component is securely set in the base film layer. Lastly, the flock material is cooled 12 and the excess flock removed at station 13 prior to removal of the finished material from the releasable surface.

FIG. II depicts a cross-sectional view of the finished flocked material showing the base film layer 14, the plastic material used to form the pattern 15, and the two applications of flock at points 16 and 17.

FIG. III also represents a diagrammatic layout of the equipment for practicing the process of the invention, this time adapted to my second embodiment. Here, roll 18 contains the open mesh plastic coated fabric, shown in FIG. IV, which fabric is coated with a plastic material from dispenser 19. The coated fabric then travels through flocking station 20, heater 21, cooling system 22 and vacuum 23 where the flocked component depicted in FIG. V is produced. This flocked component is then passed onto the second continuous releasable surface which has been covered with a film of plastic material from point 24. The entire composite is now flocked at station 25 and then totally fused or cured at point 26, and after cooling 17 and cleaning 28 the finished flocked fabric is removed from the releasable surface. The finished material is observed in FIG. VI.

To illustrate the novel methods of preparing flock decorated material, the following examples are herein given. It should be understood, however, that these examples are merely illustrative and are not to be regarded as limitations to the appended claims since the basic teachings thereof may be varied at will, as will be understood by one skilled in the art. In the examples, the proportions are expressed in parts by weight unless otherwise noted.

EXAMPLE 1

A high yield (thixotropic plastisol) (formulations to follow) composition is applied (see FIG. I) by means of a stencil roll moving transverse of the direction of travel of the carrier belt to provide interconnecting deposits of vinyl plastisol. This plastisol is comprised of the following ingredients:

| Ingredients: | Parts by weight |
| --- | --- |
| Polyvinyl chloride—plastisol (grade—Geon 121 brand) | 100 |
| Epoxidized soy bean oil (plasticizer) | 15 |
| dioctyl phthalate (plasticizer) | 45 |
| Barium-cadmium-zinc (stabilizer) | 5 |
| Thickening agent (aluminum stearate) | 3 |

The high yield plastisol formulation is such that it has a high viscosity at low shear rates; generally such formulation should require at least 0.5 minutes for a dissent of 4 inches in a Mobilometer (Gardner type) when using a 474.0 gram weight on a #1 disc. Preferably the #1 disc should take about 1 minute for a 4 inch dissent. The Gardner Mobilometer is described in "The National Paint Dictionary" (second edition, July 1942) by J. R. Stewart, at p. 90.

Employing a stencil having a thickness of .018 inches a patterned deposit of high yield plastisol is placed onto the surface of the carrier belt in a thickness of .018 inches. Thereafter, a nylon flock, .10 inches long having a denier of 40, is electrostatically applied to the carrier belt, the nylon flock being embedded in, and retained in, only the surface of the high yield plastisol. The carrier belt is then passed through a heated oven so that the vinyl layer is heated to a temperature of 280° F. for 2 minutes to partially fuse the plastisol.

Thereafter, a second plastisol, of the same formulation, is spread as a continuous film layer onto the surface of a second continuous carrier belt, with the first partially fused patterned flocked vinyl then being laid onto the wet plastisol surface. A second nylon flock, .160 inches long having a denier of 40, is deposited, by electrostatic means, onto the laminate. In this second flocking operation, the flock adheres only to the exposed portion of the second layer. Thereafter, the carrier belt passes through a heating zone exposing the layers to a temperature of 390° F. for 3½ minutes to effect final fusion and permanent joining.

EXAMPLE 2

Where desired, the patterned layer can be made from a high yield vinyl plastisol containing a blowing agent. In this case, the formulation for the high yield formula disclosed in Example 1 is modified by the addition of 5 parts by weight of azodicarbonamide. The process set forth in Example 1 is otherwise repeated.

The base plastisol layer is made with the same high yield formulation as shown in Example 1 above (without any blowing agent added), or a conventional plastisol as described in Example 2 below can be used. The flocks and fusing conditions employed in Example 2 are identical with those set forth in Example 1.

Optionally, the continuous base layer may also be made cellular by incorporating in the high yield formulation, or in the conventional plastisol, 5 parts azodicarbonamide.

EXAMPLE 3

An open mesh nylon resin coated fabric, the openings being approximately ⅛ inch square, is coated on one surface with a high yield plastisol (formulation set forth in Example 1). The method for coating is a reverse roll coater, which will apply to the upper surface of the open mesh fabric a controlled amount of vinyl plastisol, in this case an 8 mil film layer, while leaving the openings in the fabric free of the coating. The coated fabric, supported by a continuous releasable carrier belt, is passed through an electrostatic flock applying station where a Dacron polyester flock, .060 inches in length having a denier of 8, is applied. Thereafter, the flocked open mesh fabric is heated to 280° F. for 1½ minutes to effect partial fusion of the plastisol.

A base layer of vinyl plastisol, .012 inches thick, is formed as a continuous film upon a second release surface carrier belt, by spreader bar methods, 12 mils thick. The plastisol employed for this base film was of the following formula:

| Ingredients: | Parts by weight |
|---|---|
| Polyvinyl chloride—plastisol (grade—Marvinol VR—50 brand) | 100 |
| Dioctyl phthalate (plasticizer) | 30 |
| Dioctyl Azealate (plasticizer) | 12 |
| Epoxidized soy bean oil (plasticizer) | 10 |
| Barium-Cadmium-Zinc (stabilizer) | 2 |

The first partially fused flocked open mesh fabric is then laid onto (laminated) the wet surface of the continuous film of plastisol, the composite then being passed through an electrostatic flock-applying station wherein a Dacron polyester flock, .060 inches in length having a denier of 8, is applied to the wet plastisol surface exposed through the open mesh fabric. The composite is then heated at a temperature of 390° F. for 3½ minutes to completely fuse both plastisol layers.

While the flocks employed in both the first and second flock operations in all of the examples can be of the same length and color, greater pattern or texture effects result when flocks of different length and/or color are employed. The open mesh nylon fabric employed is approximately .020 inch thick.

Once again, optionally, a blowing agent, such as azodicarbonamide, can be added to the vinyl plastisol employed in producing the continuous base layer.

EXAMPLE 4

In this embodiment of my invention the grid pattern is developed from a moving mixing head through a dispenser which lays down a continuous strip of polyurethane on the surface of a releasable type conveyor belt. This self-expanding room curing urethane composite is composed of the following ingredients:

| Ingredients: | Parts by weight |
|---|---|
| A polyurethane prepolymer which is the reaction product of toluene diisocyanate in polytetramethylene ether glycol, said prepolymer having NCO terminal groups | 100 |
| Surface active agent (silicone type) | .5 |
| Catalyst (triethylenediamine) | .2 |
| Water | 3.6 |
| Stannous octoate | .4 |

The continuous conveyor belt, with polyurethane deposited thereon, is passed through an electrostatic flocking station wherein a polypropylene flock, .10 inch in length and having a denier of 30, is supplied. The timing may be such that the polyurethane is in an unexpanded condition, a partially expanded condition, or a fully expanded condition (but still possessing a tacky surface) at the time that the flock is applied. Curing, or cross-linking proceeds at room temperature.

A base film of .020 inch thick is then prepared using a vinyl plastisol of the formulation disclosed in Example 3 (base plastisol layer) by spreader means on a second conveyor belt. The previously prepared, cured (or substantially cured), and expanded flocked polyurethane grid is then laid into the wet surface of the plastisol. Thereafter the composite is passed through a second electrostatic flocking station wherein a nylon flock, .060 inch long, having a denier of 8, is applied to the still wet surface of the plastisol layer. The resulting flock product is then passed through an oven bringing the composite to a temperature of 390° F. for 4 minutes to effect final fusing of the plastisol.

EXAMPLE 5

The following polyurethane composition is substituted for the plastisol base layer set forth in Example 4:

| Ingredients: | Parts by weight |
|---|---|
| A polyurethane prepolymer which is the reaction product of toluene diisocyanate and polytetramethylene ether glycol, said prepolymer having NCO terminal groups | 100 |
| Methylene dianiline | 6.5 |
| Methyl ethyl ketone | 165.0 |

The composition is spread coated onto a carrier belt with a releasable surface to provide uniform film thickness of .015 inch. After laying in a flocked grid pattern element, the laminate is provided with a second flock, as described above in Example 4, and the composite is heated at 150° F. for 5 minutes to flash off the solvent and accelerate the cure.

EXAMPLE 6

In this example, both the grid and base film components are made from thermosetting blends of epoxy resin and polysulfide rubber. A room temperature self curing composition of the following description is applied to the surface of a release surface conveyor as a strip by dispensing from a nozzle moving generally back and forth across the width of the conveyor belt:

| Ingredients: | Parts by weight |
|---|---|
| Epoxy resin Epon 828 (reaction product of bisphenol A and epichlorohydrin) | 60 |
| Polysulfide rubber (reaction product of an alkali polysulfide and dichlorodiethylformal) such as Thiokol LP-3 | 40 |
| Curing agent (triethylenetetramine) | 5 |

While still in a wet condition a polypropylene flock (having a length of .10 inch long and a denier of 30) is applied by electrostatic means. To accelerate cure, the flocked grid pattern is exposed to temperature of 150° F. for 10 minutes.

A second film, the base layer, of the same composition is formed on a second release surface conveyor belt, by conventional spreader means, in a thickness of .020 inch. The cured flocked grid deposit is laminated to the wet surface of the base film, and the composite is thereafter passed through a second electrostatic flocking station in which a second polypropylene flock having the length of .180 inch and a denier of 30, is deposited thereon; the second flock being retained only in the exposed portion of the base layer. Thereafter, the deposit is passed through an oven, heating the total composite for 10 minutes at a temperature of 150° F.

EXAMPLE 7

Polyethylene is deposited, in a molten state, at a temperature of 350° F. in a grid-like patterned deposit from a traversing orifice onto a releasable carrier belt in a thickness of approximately .025 inch. While still in the molten state, a nylon flock (.180 inch long, having a denier of 55) is applied by electrostatic means to the surface. The flocked grid is cooled to a handling temperature of 150° F., preparatory to the laminating operation.

A base film is prepared by extruding a polyethylene film, approximately .020 inch thick onto the surface of a second release surface conveyor belt. A polyethylene sheet is then passed under heating elements to raise its temperature to approximately 350° F., causing at least the surface to become liquid. The flocked grid is laminated to the liquid surface, with the composite thereafter being immediately passed into an electrostatic flocking station where a second flock (nylon), having a thickness of .160 inch and a denier of 55, is applied to the exposed hot liquid surface of the base layer. Thereafter, the entire composite is cooled to a temperature of 150° F. and is stripped from the carrier belt.

Having thus described my invention, what I claim and desire to protect by Letters Patent is:

1. The process of producing a flock decorated material which comprises applying a plastic material selected from the group consisting of thermosettable plastics and thermoplastic resinous material in a predetermined pattern containing a plurality of spaced open portions on a continuous releasable surface, applying flock to the plastic material, partially fusing or curing the plastic to secure the flock held therein, superimposing the flocked component on a base film layer of wet plastic material selected from the group consisting of thermosettable plastics and thermoplastic resinous material, applying a second flock material to the entire composite, and applying heat to set the second flock in the exposed plastic film and also to affix the first flocked component to the second plastic layer.

2. The process of claim 1 wherein the thermosettable plastic is a polyurethane composition.

3. The process of claim 1 wherein the thermoplastic resinuous material is a vinyl plastisol composition.

4. The process of claim 1 wherein the plastic pattern contains a blowing agent.

5. The process of claim 1 wherein the base film layer contains a blowing agent.

6. The process of claim 1 wherein the predetermined pattern is achieved through the application of a plastic material selected from the group consisting of thermosettable plastics and thermoplastic resinous material over a sheet of resin coated open mesh fabric, the plurality of spaced open portions taking the form of the interstices of the fabric.

7. The process of claim 6 wherein the thermoplastic resinous material is a vinyl plastisol composition.

8. A flock decorated material comprising a base layer composed of a plastic material selected from the group consisting of thermosettable plastics and thermoplastic resinous material, a resin coated open mesh fabric affixed to said base layer, a primary application of flock adhering to the open mesh fabric and a second application of flock attached to the base layer through the interstices of the open mesh fabric.

References Cited

UNITED STATES PATENTS

| | | | |
|---|---|---|---|
| Re. 23,741 | 11/1953 | Summers | 161—63 XR |
| 2,784,630 | 3/1957 | Koprow et al. | 117—25 XR |
| 2,895,389 | 7/1959 | Nagin | 117—33 XR |
| 2,981,588 | 4/1961 | Haber | 117—25 XR |
| 3,410,747 | 11/1968 | Orr | 161—64 |

ROBERT F. BURNETT, Primary Examiner

R. H. CRISS, Assistant Examiner

U.S. Cl. X.R.

117—25, 33; 156—246, 279; 161—63, 89